United States Patent [19]

Varterasian et al.

[11] Patent Number: 4,521,057
[45] Date of Patent: Jun. 4, 1985

[54] AUTOMOBILE SEAT WITH ADJUSTABLE DAMPING

[75] Inventors: John H. Varterasian, Livonia; Richard J. Granzotto, Southfield, both of Mich.

[73] Assignee: General Motors Corporation, Detroit, Mich.

[21] Appl. No.: 466,857

[22] Filed: Feb. 16, 1983

[51] Int. Cl.³ .............................................. A47C 3/00
[52] U.S. Cl. .................................... 297/455; 248/562; 248/564; 248/595; 297/345; 297/DIG. 1
[58] Field of Search ............... 248/564, 562, 588, 591, 248/595, 593; 297/DIG. 1, 345, 302, 301, 455

[56] References Cited

U.S. PATENT DOCUMENTS

| | | | |
|---|---|---|---|
| 1,404,031 | 1/1922 | Kelman | 248/562 |
| 1,565,054 | 12/1925 | Brunker et al. | 248/564 |
| 2,845,263 | 7/1958 | Gund | 248/593 X |
| 3,455,601 | 7/1969 | Lie | 248/595 |
| 3,604,748 | 9/1971 | Lamkemeyer | 297/DIG. 1 |

FOREIGN PATENT DOCUMENTS 1806380  5/1978  Fed. Rep. of Germany ...... 248/564

Primary Examiner—James T. McCall
Attorney, Agent, or Firm—Charles E. Leahy

[57] ABSTRACT

Adjustable damping is provided for the seat bottom cushion of a vehicle seat of the type having a seat frame which is mounted at a stationary position on the vehicle floor. A resilient seat cushion is mounted upon the seat frame and is resiliently compressed relative to the frame by the static occupant load when the occupant sits upon the seat bottom cushion. Occupant movement causes the further resilient movement of the seat bottom cushion above and below the static vertical position. A scissors mechanism acts between the vehicle body and a plate attached to or embedded in the seat bottom cushion to translate the vertical movement of the seat bottom cushion into a horizontal movement of a portion of the scissors mechanism. An adjustable damping device such as a dash pot is operatively connected to the horizontally movable portion of the scissors mechanism whereby the vertical movement of the seat bottom above and below the static vertical position is adjustably damped to provide a desired occupant ride.

1 Claim, 3 Drawing Figures

AUTOMOBILE SEAT WITH ADJUSTABLE DAMPING

The invention relates to a conventional automobile seat and more particularly provides an adjustable damper by which the comfort of the seat may be adjusted.

BACKGROUND OF THE INVENTION

In general, soft seats provide a desirable ride in vehicles which are driven on first class roads and freeways. A soft seat is not desirable however on rough or degraded roads or in off road vehicles because the occupant may bounce excessively on the seat. Accordingly, a well damped seat is desirable on rough roads. In addition, the handling requirements of high performance vehicles such as sports cars also required well damped seats. However, contradictions to these generalizations abound in view of the personal comfort preferences of different seat occupants.

Accordingly, it would be advantageous to provide a seat with variable damping, i.e., a soft less damped seat could be provided at one time and a sports car ride with a well damped seat provided at another time. Thus, the damping rate of the seat could be varied to suit the road surface as well as the personal preference of the seat occupant.

It is well known in truck seats to provide a seat frame which is mounted above the vehicle floor by a support linkage having an associated adjustable damping means such as a hydraulic or pneumatic cylinder. The seat cushion or resilient foam or a foam enclosed spring structure is mounted upon the seat frame. When the occupant sits upon the seat, the static occupant load upon the seat compresses the seat frame support linkage and damping means. The seat cushion is also compressed. Vehicle vibrations cause further resilient movement of the seat frame and seat cushion above and below the static vertical position.

The application of the aforedescribed truck seat to passenger cars is not favored because the environment of the passenger car occupant compartment does not accommodate a vehicle seat in which the entire seat including the seat frame and the seat cushion would move up and down relative the vehicle floor.

Accordingly the object, feature and advantage of the present invention resides in the provision of a seat cushion damping means for a passenger car seat in which the seat frame is conventionally mounted relative the vehicle floor and the seat cushion damping means acts between the vehicle body and the resilient seat cushion.

SUMMARY OF THE INVENTION

According to the invention a vehicle seat includes a seat frame which is mounted stationary on the vehicle floor. A resilient seat bottom is mounted upon the seat frame and is resiliently compressed relative to the seat frame by the static occupant load when the occupant sits upon the resilient seat bottom. Vibrations caused by vehicle and occupant movement cause further resilient movement of the seat bottom above and below the static vertical position. A scissors mechanism acts between the vehicle body and the resilient seat bottom and is adapted to translate the vertical vibratory movement of the resilient seat bottom into a horizontal vibratory movement of a portion of the scissors mechanism. An adjustable damping device is mounted on the vehicle body, preferably a forward wall of the stationary seat frame, and operatively connected to the horizontally movable portion of the scissors mechanism whereby the vertical vibratory movement of the seat bottom above and below the static vertical position is adjustably damped to provide a desired occupant ride.

In those vehicle seat constructions where the seat bottom is a resilient foam bun, a plate is embedded within the foam bun and the scissors mechanism is connected to the plate. In other vehicle seat constructions the seat bottom includes a yieldable suspension spring structure supported on the seat frame and in turn supporting a resilient foam pad. The scissors mechanism is connected to the yieldable suspension spring structure.

BRIEF DESCRIPTION OF THE DRAWING

These and other objects, features and advantages of the invention will become apparent upon consideration of the specification and the appended drawings in which.

DESCRIPTION OF THE PREFERRED EMBODIMENT

Figure 1:
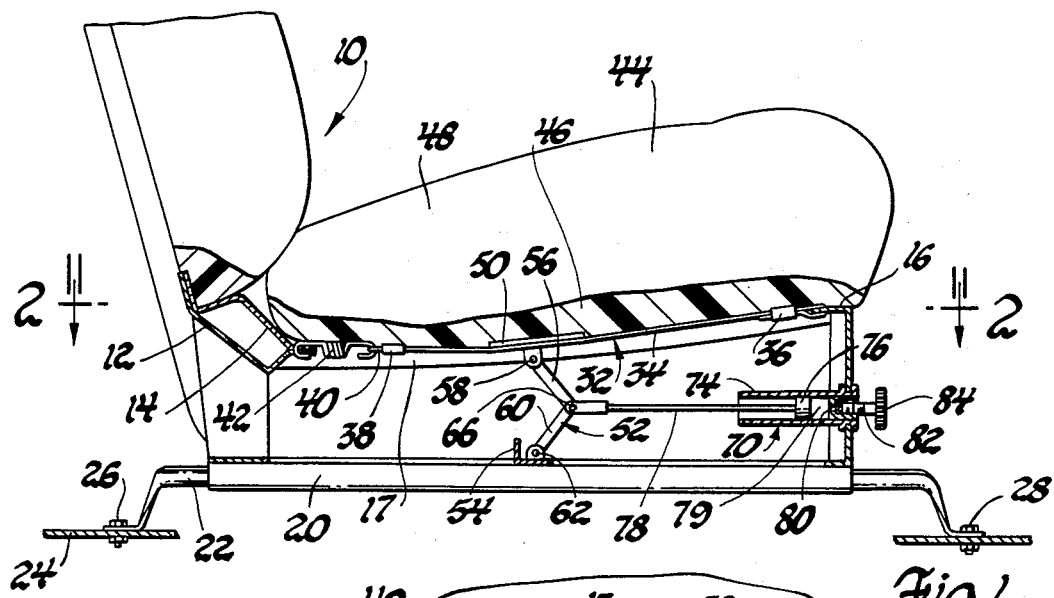
FIG. 1 is a side elevation view of a vehicle seat comprised of a suspension spring structure and foam cushion having the adjustable damping mechanism invention.
Figure 2:
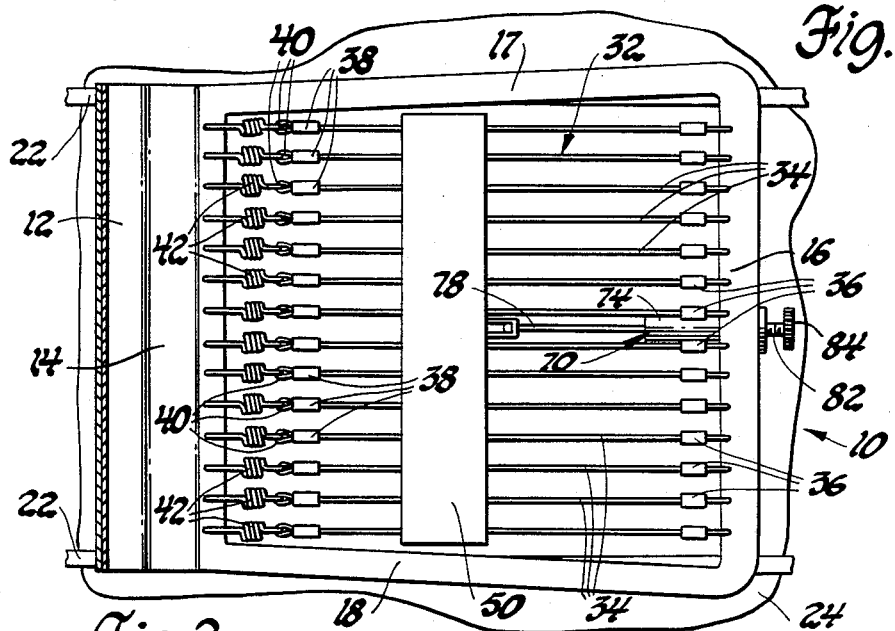
FIG. 2 is a sectional view taken in the direction of arrows 2—2 of FIG. 1.

Referring to FIG. 1, there is shown a vehicle seat 10 including a seat bottom frame 12 comprised of a plurality of welded together sheet metal stampings defining a rear frame rail 14, a front frame rail 16, and side frame rails 17 and 18. The frame rails depend vertically and are suitably attached to an upper seat adjuster track 20 which slidably engages a lower seat adjuster track 22 attached to the vehicle floor 24 by bolts 26 and 28. The upper seat adjuster track 20 slides fore and aft along the lower seat adjuster track 22 to adjust the fore and aft position of the seat 10. A conventional seat adjuster latch, not shown, acts between the upper and lower seat adjuster tracks to maintain an adjusted position of the seat 10.

Seat 10 includes a suspension spring structure 32 including a plurality of wires 34 which extend through holes in the front frame rail 16 and are attached by retainers 36. The rearward end of the wires 34 are reversely bent and attached by retainers 38 to form loops 40. A plurality of coil tension springs 42 have their ends hooked through holes in the rear frame rail 14 and hooked through the loops 40 of the wires 34. A seat cushion 44 comprised of a resilient foam bun 46 enclosed within a seat cover 48 is supported by the suspension spring structure 32.

When an occupant sits upon the cushion 44, the static weight of the occupant compresses the resilient foam bun 46 and also depresses the suspension spring structure 32 as permitted by yielding an extension of the coil tension springs 42. Accordingly, it will be understood that imposition of the occupant static weight upon the seat causes the suspension spring structure 32 to assume a certain static vertical position.

Upon movement of the vehicle over the road surface, the relative movement between the occupant and the vehicle is accommodated by further resilient movement of the suspension spring structure 32 above and below the static vertical position. The extent of such movement, and thus the ride experienced by the seat occupant is determined by the spring characteristics of the suspension spring structure 32 and the foam bun 46.

An adjustable damping device for tuning the spring characteristics of the vehicle seat includes a plate 50 which overlies the suspension spring structure 32 and may be bonded to either or both of the plurality of wires 34 and the resilient foam bun 46 for unitary vertical movement therewith. A scissors mechanism, generally indicated at 52, acts between the plate 50 and a support bracket 54 which extends transversely of the seat between the upper seat adjuster tracks 20 at each side of the seat. The scissors mechanism 52 includes an upper link 56 having an upper end connected to the plate 50 by a pivot 58. The scissors mechanism 52 also includes a lower link 60 pivotally connected to the bracket 54 by a pivot 62. The other ends of the upper and lower scissors links are connected together by a pivot 66. As seen in FIG. 1 vertical movement of the plate 50 changes the vertical spacing between the pivots 58 and 62 so that the scissors links 56 and 60 are moved pivotally and the pivot 66 moves horizontally fore and aft.

The adjustable damping means includes a dash pot assembly 70 which is connected to the scissors mechanism 52. The dash pot assembly 70 includes a cylinder 74 which is attached to the front frame wall 16. A piston 76 is sealingly slidable within the cylinder 74 and is connected to the pivot 66 of the scissors mechanism 52 by a connecting rod 78. The piston 76 and the cylinder 74 cooperate to define an air chamber 79 which varies in volume with horizontal fore and aft movement of the piston 76. Ambient air is permitted to enter or leave the air chamber 79 through an orifice 80 which is adjusted by a valve 82 operated by an operator accessible knob 84.

In operation, the vertical movement of the plate 50 with the vertical movement of the suspension spring structure 32 and the foam bun 46 is translated into a horizontal fore and aft motion of the pivot 66 by the scissors mechanism 52. This horizontal movement of the pivot 66 causes the connecting rod 78 and piston 76 to move within the cylinder 74. Such horizontal movement of the piston 76 is controlled by the rate at which ambient air is permitted to enter or leave the air chamber 79 through the orifice 80. Thus, the scissors mechanism 52 and the dash pot assembly 70 cooperate to damp the rate of vertical movement of the plate 50 and the seat cushion 44. This damping rate can be modified to suit the occupant preference and the highway conditions by adjusting the valve 82 by rotating the knob 84.

Figure 3:
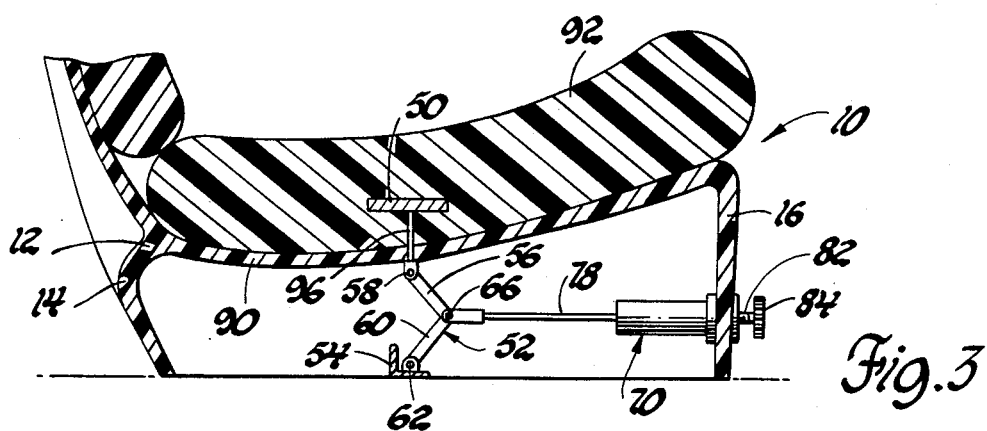
FIG. 3 is a view similar to FIG. 1 but showing a second embodiment of the invention in which the seat bottom is provided by a resilient foam cushion.

Referring to FIG. 3, there is shown an alternate vehicle seat construction in which like elements are designated by like numerals. In this seat structure a molded plastic seat pan 90 supports a resilient foam bun 92. The resilience of the seat cushion is provided entirely by the vertical movement of a resilient foam bun 92. The plate 50 is embedded within the foam bun 92 and connected to the pivot 58 at the upper end of the upper link 56 by a rod 96 which extends vertically and projects through a hole in the seat pan 90. When an occupant is seated upon the foam bun 92, the static occupant weight somewhat compresses the foam bun 92. The downward movement of the plate 50 collapses the scissors mechanism 52. Upon motion of the vehicle the additional resilient movement of the foam bun 92 above and below the static vertical position induces a vertical movement of the plate 50 and the pivot 58 of the scissors linkage 52. The scissors linkage 52 translate this vertical movement of the plate into a horizontal movement which is damped by the dash pot assembly 70 in the same manner as described hereinbefore with reference to the seat construction of FIG. 1.

Thus it is seen that the invention provides a motor vehicle seat in which a seat frame is conventionally mounted at a vertically fixed position and an adjustable damper is provided to dampen the vertical movement of the seat cushion relative to the vertically fixed frame to enable adjustable damping of the vehicle seat cushion.

The embodiments of the invention in which an exclusive property or privilege is claimed are defined as follows:

1. A vehicle seat comprising:
   a stationary seat support;
   a seat cushion of resilient foam vertically compressible to a static vertical condition relative to the stationary seat support corresponding to a certain static occupant load upon the seat and further resiliently movable above and below the static vertical position in response to vehicle vibrations;
   plate means embedded within the foam cushion;
   a scissors mechanism acting between the vehicle body and the plate means and adapted to translate vertical movement of the plate relative to the stationary seat support into a horizontal movement of a portion of the scissors mechanism; and
   an adjustable damping means mounted on the vehicle body and operatively connected to the horizontally movable portion of the scissors mechanism whereby the vertical movement of the seat cushion relative to the stationary seat support above and below the static vertical position is adjustably damped to provide a desired occupant ride.

* * * * *